US007028027B1

(12) United States Patent
Zha et al.

(10) Patent No.: US 7,028,027 B1
(45) Date of Patent: Apr. 11, 2006

(54) ASSOCIATING DOCUMENTS WITH CLASSIFICATIONS AND RANKING DOCUMENTS BASED ON CLASSIFICATION WEIGHTS

(75) Inventors: Hongyuan Zha, State College, PA (US); Sean Suchter, San Mateo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 419 days.

(21) Appl. No.: 10/262,519

(22) Filed: Sep. 30, 2002

Related U.S. Application Data

(60) Provisional application No. 60/411,567, filed on Sep. 17, 2002.

(51) Int. Cl.
*G06F 17/00* (2006.01)

(52) U.S. Cl. ................. 707/3; 707/102; 707/104.1; 707/101

(58) Field of Classification Search ........... 707/3–6, 707/101, 104.1, 102; 715/501.1

See application file for complete search history.

(56) References Cited

U.S. PATENT DOCUMENTS

| 5,905,510 A * | 5/1999 | Hagiwara et al. ............. 347/7 |
| 5,909,510 A * | 6/1999 | Nakayama ................. 382/229 |
| 6,067,552 A * | 5/2000 | Yu .......................... 715/501.1 |
| 6,078,916 A * | 6/2000 | Culliss ......................... 707/5 |
| 6,584,470 B1* | 6/2003 | Veale ........................ 707/102 |
| 6,615,209 B1* | 9/2003 | Gomes et al. ................. 707/5 |
| 6,618,727 B1* | 9/2003 | Wheeler et al. ............. 707/10 |
| 6,678,677 B1* | 1/2004 | Roux et al. ................... 707/3 |
| 6,681,223 B1* | 1/2004 | Sundaresan .................. 707/6 |
| 6,711,585 B1* | 3/2004 | Copperman et al. ..... 707/104.1 |
| 6,785,676 B1* | 8/2004 | Oblinger ...................... 707/5 |

* cited by examiner

*Primary Examiner*—Charles Rones
*Assistant Examiner*—Sana Al-Hashemi
(74) *Attorney, Agent, or Firm*—Hickman Palermo Truong & Becker, LLP

(57) ABSTRACT

A method and apparatus for associating documents with classification values and ranking documents based on classification weights is provided. It is determined if a document is associated a classification. If the document is associated with a classification, then it is determined if a classification value, which is associated with the document, is associated with a weight. If the classification value is associated with a weight, then a rank of the document is adjusted based on the weight that is associated with the classification value.

8 Claims, 11 Drawing Sheets

ASSOCIATING DOCUMENTS WITH CLASSIFICATIONS AND RANKING DOCUMENTS BASED ON CLASSIFICATION WEIGHTS

CLAIM OF PRIORITY

This application claims priority to Provisional Application Ser. No. 60/411,567, filed Sep. 17, 2002, entitled "REGION ID AND APPLICATIONS OF REGION ID," by Hongyuan Zha and Sean Suchter, the entire contents of which are incorporated by reference as if fully set forth herein.

FIELD OF THE INVENTION

The present invention relates to search engines, and in particular, to associating documents with classification values, and ranking documents that are associated with classifications based on weights associated with the classification values.

BACKGROUND OF THE INVENTION

A search engine is a computer program that helps a user to locate information. Using a search engine, a user can enter one or more query terms and obtain a list of resources that contain or are associated with subject matter that matches those query terms. While search engines may be applied in a variety of contexts, search engines are especially useful for locating resources that are accessible through the Internet. One can use a search engine to generate a list of Universal Resource Locators (URLs) and/or Hypertext Markup Language (HTML) links to files, or pages, that are likely to be of interest. Such files, or pages, may be generally referred to as documents. Documents may contain text, images, and/or other data that is meaningful to humans or computers. For sake of simplicity, "document" is used herein to refer to a URL or HTML link to a file or page as well as the file or page itself.

Some search engines order a list of documents before presenting the list to a user. To order a list of documents, a search engine may assign a rank to each document in the list. When the list is sorted by rank, a document with a relatively higher rank may be placed closer to the head of the list than a document with a relatively lower rank. The user, when presented with the sorted list, sees the most highly ranked documents first. To aid the user in his search, a search engine may rank the documents according to relevance. Relevance is a measure of how closely the subject matter of the document matches query terms.

Because of the global nature of the Internet, a given set of query terms may cause a search engine to return a list that includes documents from multiple regions. Some of the documents, while having a high relevance with regard to the query terms, may contain subject matter that is primarily concerned with a region in which the user has no interest. For example, a user in France searching with a query term that contains "gouvernement," the French word for "government," may receive a list that contains documents that discuss the governments of the French-speaking provinces of Canada (because the documents contain the word "gouvernement"). If the user performed the search from a site in France, then the user may be surprised and dismayed that he is required to find, in a list that includes documents that discuss Canadian governments, documents that discuss the government of France. Even if the list contains documents that discuss the government of France, these may have a lower relevance rank, and may therefore be located lower in the list. Relevance rank alone often fails to compensate for regional differences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

Techniques are provided for associating documents with classification values and ranking documents based on classification weights. It is determined if a document is associated a classification. If the document is associated with a classification, then it is determined if a classification value associated with the document is associated with a weight. If the classification value is associated with a weight, then a rank of the document is adjusted based on the weight that is associated with the classification value.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for associating documents with classifications and ranking documents based on classification weights is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
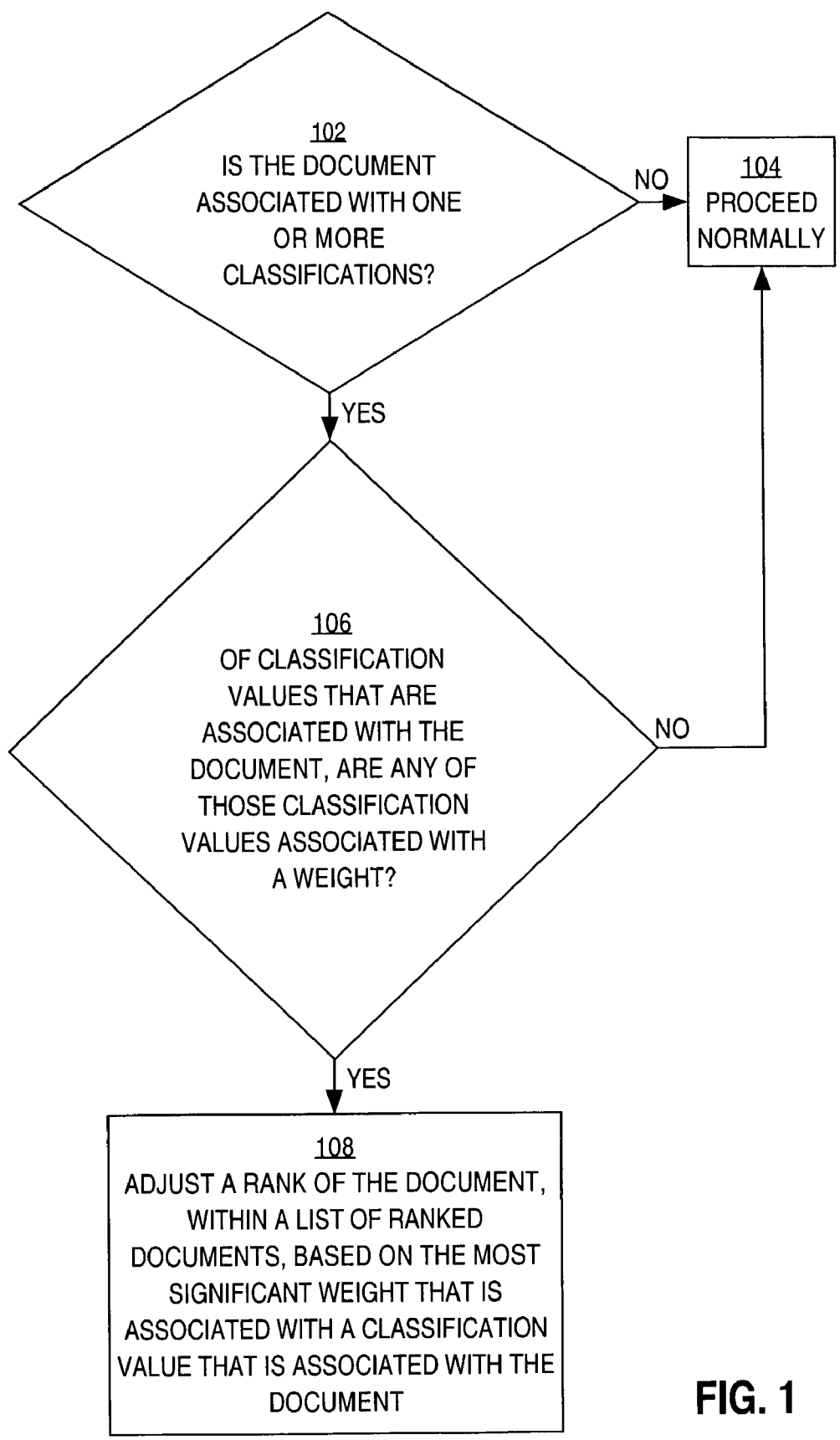
FIG. 1 is a flow diagram that illustrates a technique, according to an embodiment of the present invention, for adjusting a rank of a document within a list of ranked documents.

FIG. 1 is a flow diagram that illustrates a technique, according to an embodiment of the present invention, for adjusting a rank of a document within a list of ranked documents. In block 102, it is determined whether the document is associated with one or more classifications. A technique for associating a document with one or more classifications is described in further detail below. The classifications are separate from a relevance rank that may already be associated with the document. One example of a classification is a regional (e.g., national) classification. Another example of a classification is a language classification. In one embodiment, a search engine determines whether the document is associated with one or more classifications.

If the document is not associated with one or more classifications, then, in block 104, execution (e.g., of the search engine) proceeds normally. If the document is associated with one or more classifications, then, in block 106, it is determined whether any classifications values that are associated with the document are also associated with a weight. An example of a classification value for a regional classification is "France." An example of a classification value for a language classification is "French." A technique for associating a classification value with a weight is described in further detail below. In one embodiment, a search engine determines whether any of the classification values that are associated with the document are also associated with a weight.

If none of the classification values that are associated with the document are associated with a weight, then, in block 104, execution (e.g., of the search engine) proceeds normally. If one or more of the classifications that are associated with the document are associated with a weight, then, in block 108, a rank of the document, within a list of ranked documents, is adjusted based on the most significant weight that is associated with a classification that is associated with the document. For example, a search engine may add or multiply a relevance rank of the document by a numeric weight to produce an adjusted rank, and then associate this adjusted rank to the document. After ranking one or more of the document in the list in this manner, the search engine may then sort the list according to the weight-adjusted ranks, and present the sorted list to a user.

As a result, the user may receive a list of documents in which documents that are associated with a particular classification value will be seen sooner than other documents. The other documents not so associated may remain in the list, but at a lower location. By selecting classification values that are likely to segregate documents according to the interests of a user of a particular search engine that is located at a particular Internet site, those who manage the search engine may enable the search engine to produce results that are especially ranked and organized for users of the search engine. For example, those who manage a search engine that is located at an Internet site in France may implement regional classifications and associate a relatively high weight to a French regional classification value in order to promote, in a list of search results, documents that are associated with France.

Adjusting Document Rank Based on Region and Language

Figure 2A:
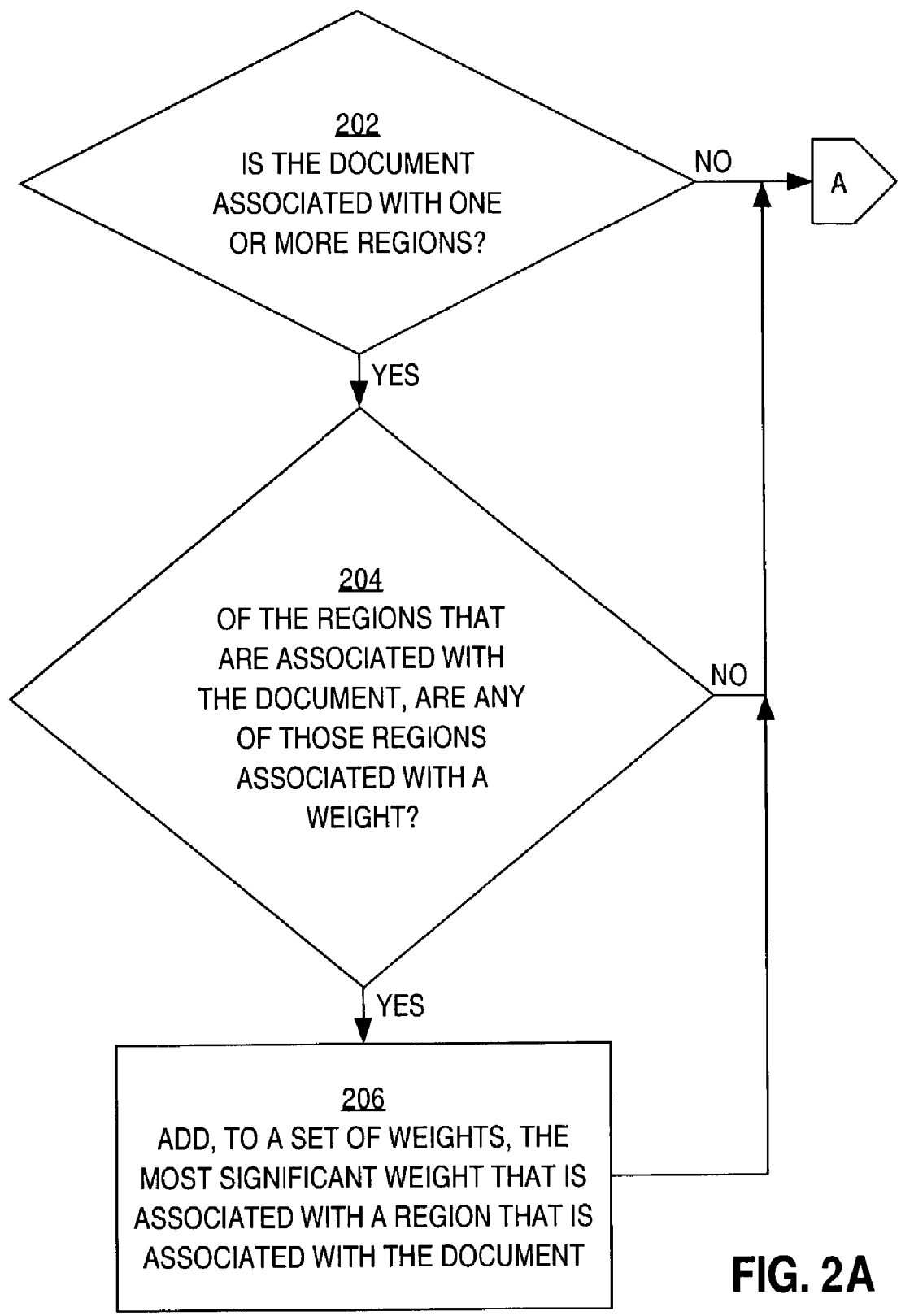
FIGS. 2A, 2B, and 2C are flow diagrams that illustrate a technique, according to an embodiment of the present invention, for adjusting a rank of a document, within a list of ranked documents, based on region and language.
Figure 2B:
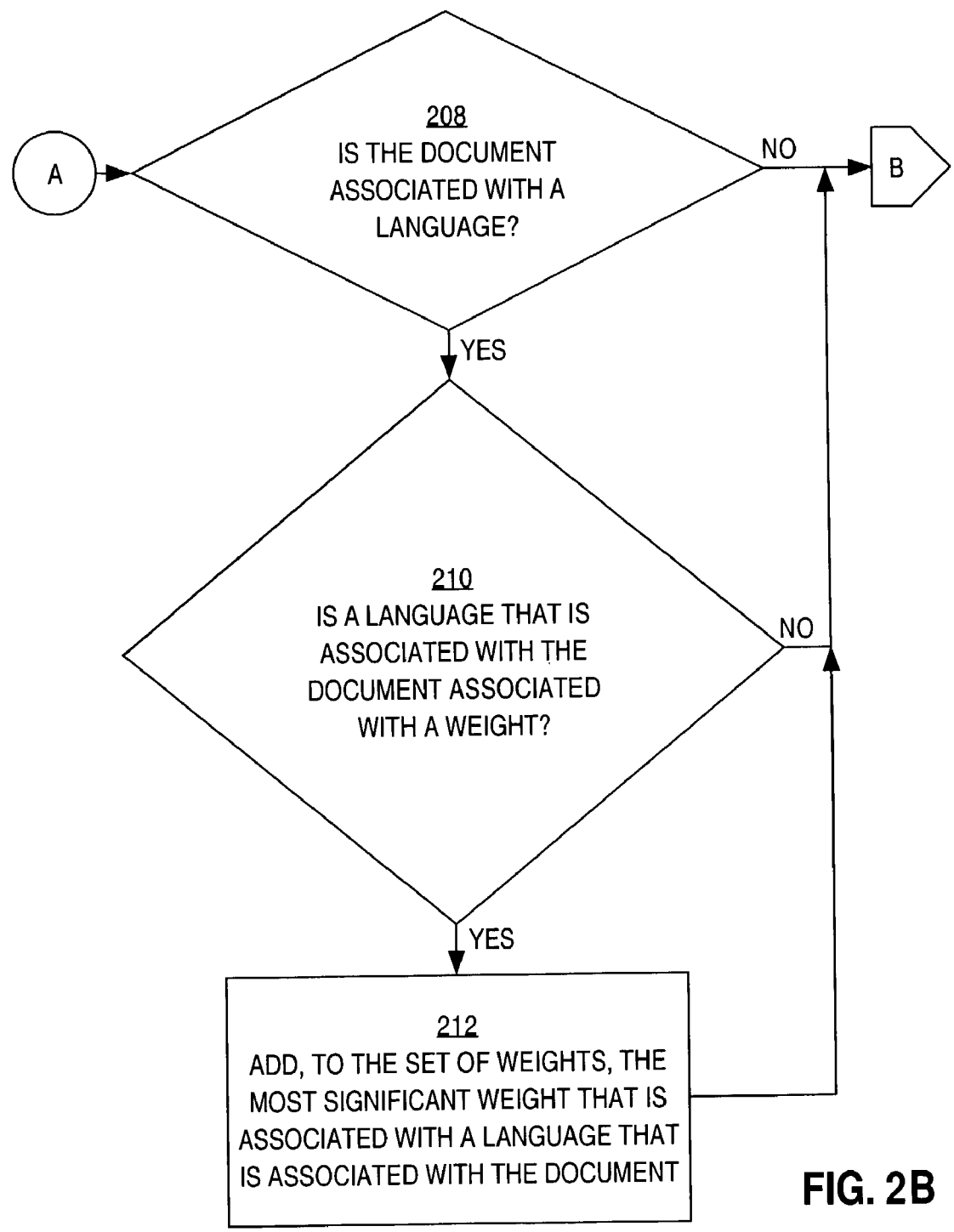
Figure 2C:
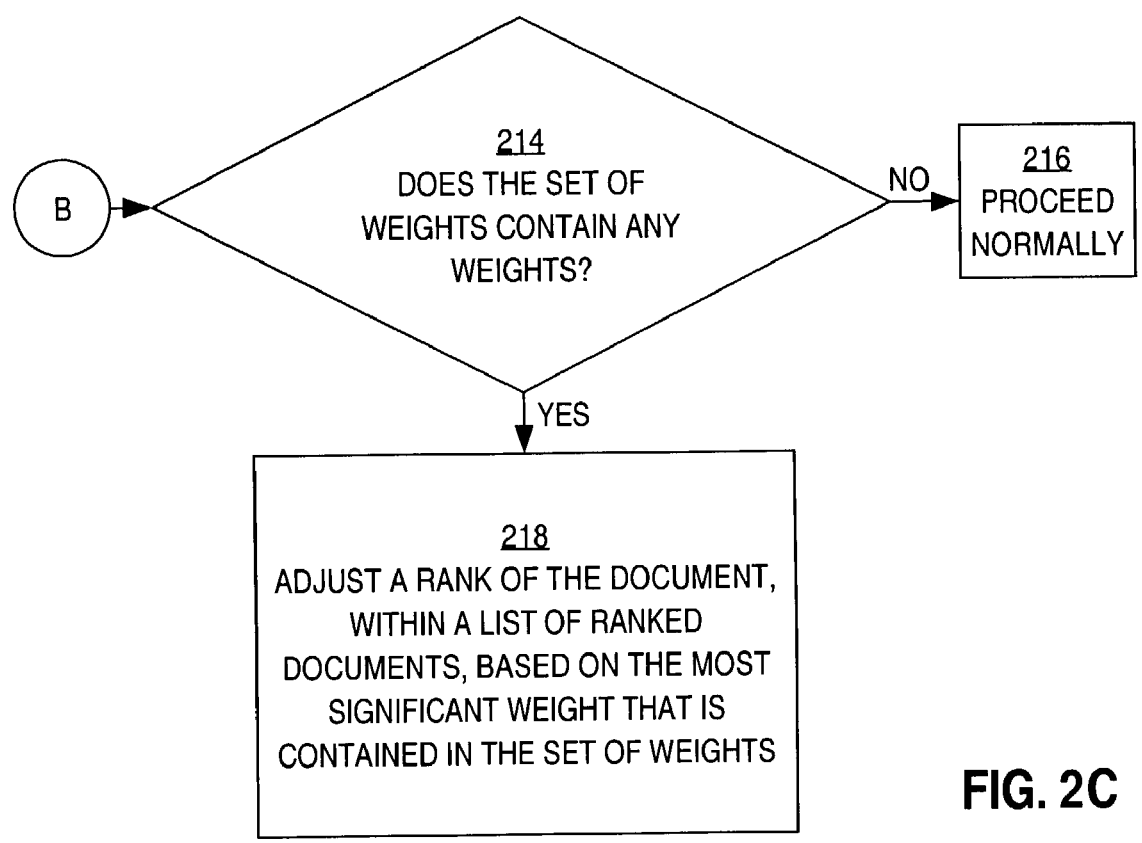

FIGS. 2A, 2B, and 2C are flow diagrams that illustrate a technique, according to an embodiment of the present invention, for adjusting a rank of a document, within a list of ranked documents, based on region and language. Referring to FIG. 2A, in block 202, it is determined whether the document is associated with one or more regions. A technique for associating a document with one or more regions is described in further detail below. In one embodiment, a search engine determines whether the document is associated with one or more regions. In one embodiment, each region is a nation.

If the document is not associated with one or more regions, then control passes to block 208 illustrated in FIG. 2B. If the document is associated with one or more regions, then, in block 204, it is determined whether any of the regions that are associated with the document are also associated with a weight. A technique for associating a region with a weight is described in further detail below. In one embodiment, a search engine determines whether any of the regions that are associated with the document are also associated with a weight.

If none of the regions that are associated with the document are associated with a weight, then control passes to block 208 illustrated in FIG. 2B. If one or more of the regions that are associated with the document are associated with a weight, then, in block 206, the most significant weight that is associated with a region that is associated with the document is added to a set of weights. For example, if a document is associated with multiple regions, then a search engine may select a largest numeric weight that is associated with any of those regions and add that weight to a set of weights. Control then passes to block 208 illustrated in FIG. 2B.

Referring to FIG. 2B, in block 208, it is determined whether the document is associated with a language. A technique for associating a document with a language is described in further detail below. In one embodiment, a search engine determines whether the document is associated with a language. In one embodiment, a document is associated with at most one language.

If the document is not associated with a language, then control passes to block 214 illustrated in FIG. 2C. If the document is associated with a language, then, in block 210, it is determined whether a language that is associated with the document is also associated with a weight. A technique for associating a language with a weight is described in further detail below. In one embodiment, a search engine determines whether the language that is associated with the document is also associated with a weight.

If no language that is associated with the document is associated with a weight, then control passes to block 214 illustrated in FIG. 2C. If a language that is associated with the document is associated with a weight, then, in block 212, the most significant weight that is associated with a language that is associated with the document is added to a set of weights. The set of weights is the same set of weights to which a weight that is associated with a region that is associated with the document might have been added. Control then passes to block 214 illustrated in FIG. 2C.

Referring to FIG. 2C, in block 214, it is determined whether the set of weights contains any weights. For example, a search engine may determine whether the set of weights includes a weight that is associated with a region or a weight that is associated with a language.

If the set of weights does not include any weights (i.e., it is an empty set), then, in block 216, execution (e.g., of the search engine) proceeds normally. If the set of weights does include one or more weights, then, in block 218, a rank of the document, within a list of ranked documents, is adjusted based on the most significant weight that is contained in the set of weights. For example, a search engine may multiply a relevance rank of the document by the largest numeric weight that is contained in the set of weights to produce an adjusted rank, and then associate this adjusted rank to the document. After ranking one or more of the documents in the list in this manner, the search engine may then sort the list according to the weight-adjusted ranks, and present the sorted list to a user. Thus, either a language or a region that is associated with the document, whichever is weighted to be the most significant, may be used to adjust a document's rank. Some languages may be associated with more significant weights than some regions, and some regions may be associated with more significant weights than some languages.

By associating varying weights to languages and regions that are associated with documents, those who manage a search engine may enable the search engine to produce results that are especially organized for users of the search engine. For example, those who manage a search engine that is located at an Internet site (e.g., portal) in Canada may associate a highly significant weight with the Canadian region, and a less significant weight with the French language. This will cause documents that are associated with the Canadian region, even if those documents are not associated with the French language, to be promoted to more prominent positions in a list than documents that are associated with the French language but not associated with the Canadian region. This will also cause documents that are associated with the French language but not associated with the Canadian region to be promoted to more prominent positions in a list than documents that are not associated with either the French language or the Canadian region. A given search engine may service searches that are performed through multiple Internet sites (e.g., portals). Each Internet site may communicate to the search engine a different set of classification value-weight associations for the search engine to use in adjusting document ranks.

In one embodiment, the rank of a document may be adjusted based not only on its association with a particular classification, but based on a calculated probability that the document is correctly associated with the particular classification. For example, given two documents, there may exist a greater degree of certainty that one document is correctly associated with a particular classification, and there may exist a lesser degree of certainty that another document is correctly associated with the particular classification. In one embodiment, the probability that a particular document is correctly associated with a particular classification may be expressed as a number between 0 and 1, where 0 represents a complete certainty that the document has no connection to the classification, and 1 represents a complete certainty that the document is correctly associated with the classification. This probability is separate from a weight associated with a classification. A search engine may adjust a relevance rank of a document by multiplying the rank by the product of the weight and the probability that are associated with a classification that is associated with the document.

In one embodiment, the weights described above may be multiplied by a scaling factor. The scaling factor is separate from the weights. Thus, if those who manage a search engine desire that the weights should have less effect relative to relevance ranks, then those who manage the search engine may specify a small scaling factor. Alternatively, a large scaling factor may be specified to influence ranks of documents to a greater extent.

Associating a Classification Value with a Weight

Figure 3:
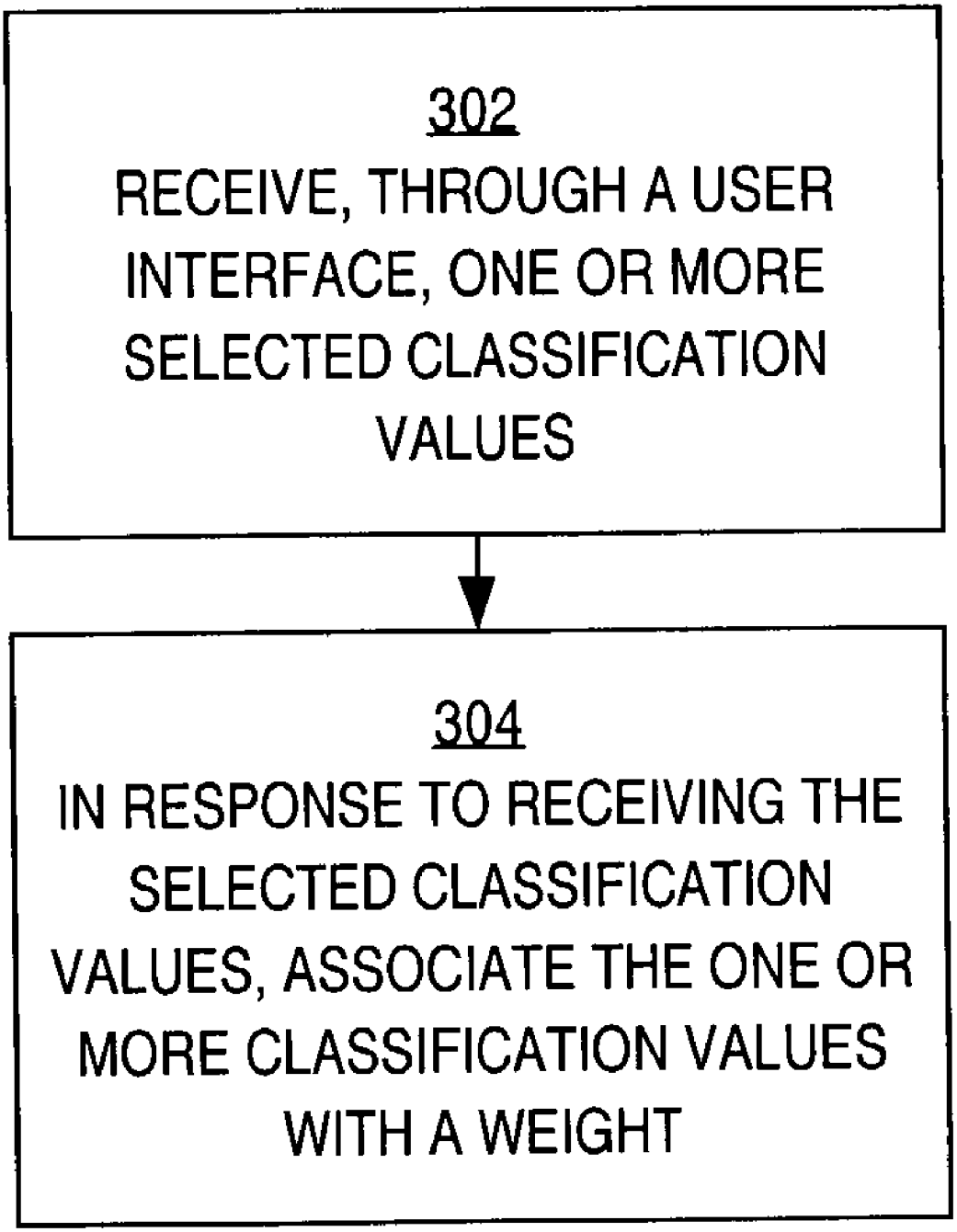
FIG. 3 is a flow diagram that illustrates a technique, according to an embodiment of the present invention, for associating a classification value with a weight.

FIG. 3 is a flow diagram that illustrates a technique, according to an embodiment of the present invention, for associating a classification value with a weight. In block 302, one or more selected classification values are received through a user interface. For example, a search engine may receive, through a user interface, one or more classification values that have been selected by a user. For a more specific example, a user may select a control, on an HTML form, that indicates by its selection that the user is primarily interested in documents that are associated with the German language. For another example, a user may select a control that indicates that the user is chiefly interested in documents that are associated with Switzerland.

In block 304, in response to receiving the selected classification values, the one or more selected classification values are associated with a weight. Each selected classification value may be associated with a different weight. In one embodiment, the user may specify, through the user interface, the weight to be associated with each selected classification value. In another embodiment, each selected classification value is associated with the same weight. Thereafter, when the search engine adjusts a rank of a document in a list of ranked documents, the weights associated with the selected classification values are used in the adjustment.

Alternatively, weights associated with classification values may be obscured from users of a search engine. A manager of a search engine may associate one or more classification values with weights without input from users of the search engine. One search engine may be configured to use a different set of classification value-weight associations than another search engine. Thus, a search engine located in France may be configured to use a set of region-weight associations in which the French region is weighted, while a search engine located in Germany may be configured to use a set of region-weight associations in which the German region is weighted.

Associating a Document with a Region

A document is typically stored on a host. A host is a physical storage device, such as a personal computer or workstation that has a hard disk drive, that is communicatively coupled to a network. A host name uniquely identifies a host within a network. For example, a host name might be "internal.inktomi.com".

One or more hosts may be contained within a domain. A domain is a group of hosts whose host names share a common suffix. This suffix is referred to as the domain name. For example, a host named "internal.inktomi.com" is contained in a domain named "inktomi.com".

Each domain is contained in one of a plurality of top-level domains. A top-level domain is a group of domains whose domain names share a common suffix. For example, a domain named "inktomi.com" is contained in the top-level domain ".com".

Top-level domains may be categorized as being either regional or generic top-level domains. Regional top-level domains indicate a region, usually through a two-letter abbreviation of the region. For example, the regional top-level domain ".fr" indicates France, and the regional top-level domain ".de" indicates Germany (Deutschland). The region indicated by a regional top-level domain may correspond to a political entity such as a nation. However, some regional top-level domains indicate regions that are not political entities (e.g., ".aq" indicates Antarctica).

Any top-level domain that cannot be categorized as a regional top-level domain is referred to herein as a generic top-level domain. Some examples of generic top-level domains include ".com", ".edu", ".net", and ".org". Generic top-level domains do not indicate regions, and may contain hosts from among several different regions. Typically, hosts in the United States are contained in a generic top-level domain instead of a regional top-level domain.

While top-level domains are categorized herein as being either regional or generic top-level domains, alternative embodiments of the invention may categorize top-level domains according to other categories.

Figure 4:
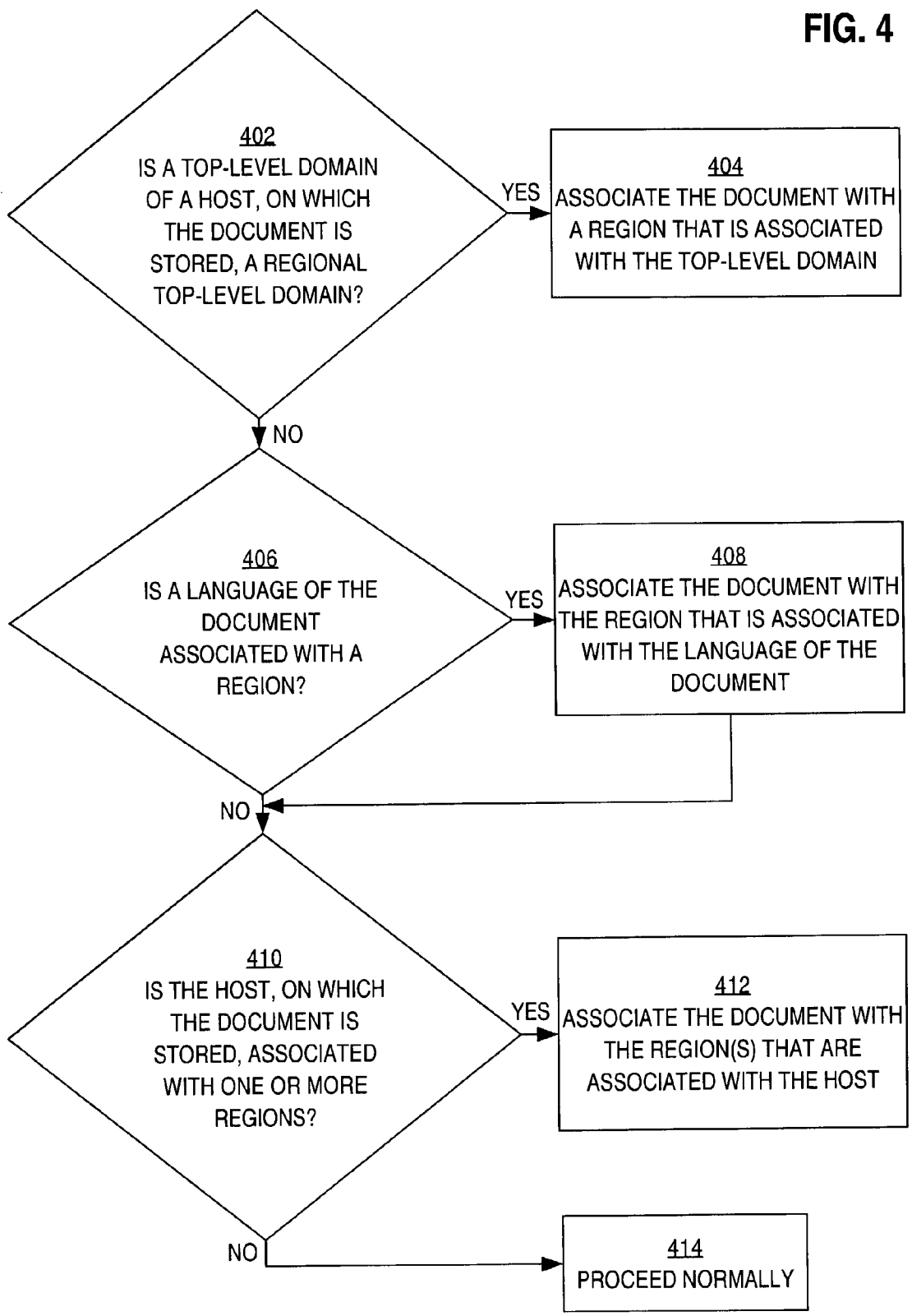
FIG. 4 is a flow diagram that illustrates a technique, according to an embodiment of the present invention, for associating a document with one or more regions.

FIG. 4 is a flow diagram that illustrates a technique, according to an embodiment of the present invention, for associating a document with a region. While the flow diagram illustrates a technique for associating a document with a region, the technique described below may be modified to associate a document with a classification other than a regional classification.

In block 402, it is determined whether a top-level domain of a host, on which the document is stored, is a regional top-level domain. For example, a computer program may compare the top-level domain of the host to a list of regional top-level domains to determine if the top-level domain of the host is a regional top-level domain.

If the top-level domain of the host is a regional top-level domain, then, in block 404, the document is associated with a region that is associated with (or indicated by) the top-level domain. For example, a computer program may add, to a database, an entry that associates the document (i.e., the full path of the document including the host name) with the region that is associated with the top-level domain.

If the top-level domain of the host is not a regional top-level domain, then, in block 406, it is determined if a language of the document is associated with a region. For example, a computer program may compare the language of the document to a list of regions that are associated with languages to determine if the language of the document is associated with a region. A technique for associating a language with a region is described in further detail below.

If the language of the document is associated with one or more regions, then, in block 408, the document is associated with the region(s) that are associated with the language of the document. For example, a computer program may add, to a database, an entry that associates the document (i.e., the full path of the document including the host name) with the region(s) that are associated with the language of the document. Control then passes to block 410.

In one embodiment, in block 408, the region(s) with which a document is associated exclude regions that are associated with languages that are not strongly correlated, respectively, with more than one region. In one embodiment, in block 408, the region(s) with which a document is associated exclude region(s) that are associated with languages that are listed in Table 1 above. Therefore, in one embodiment, before a document is associated with a region, it is determined whether that region is contained in a particular set of regions (e.g., the regions listed in Table 2).

In block 410, it is determined if the host, on which the document is stored, is associated with one or more regions.

For example, a computer program may compare the host name of the host on which the document is stored to a list of host names of hosts that are associated with one or more regions to determine if the host is associated with one or more regions. A technique for associating a host with one or more regions is described in further detail below.

If the host, on which the document is stored, is associated with one or more regions, then, in block 412, the document is associated with the region(s) that are associated with the host on which the document is stored. For example, a computer program may add, to a database, an entry that associates the document (i.e., the full path of the document including the host name) with the region(s) that are associated with the host on which the document is stored.

If the host, on which the document is stored, is not associated with one or more regions, then, in block 414, execution (e.g., of a computer program that associates documents with one or more regions) proceeds normally.

In one embodiment of the invention, one or more documents may be expressly associated with one or more regions according to input from a human editor. Editor input may override automatically determined associations. For example, a computer program may inspect a file to determine if any express associations are specified therein, and then modify any conflicting associations accordingly.

After a document is associated with one or more regions, a search engine may use the association to adjust a rank of the document in a ranked list of documents according to a weight that is associated with a region with which the document is associated, as described above.

Associating a Language with One or More Regions

Once a language of a document is determined, one or more regions may be associated with that language according to Tables 1 and 2 below. In Tables 1 and 2, some languages are associated with only one region, while other languages are associated with multiple regions. This is because some languages are used in more than one region (or nation). Thus, a language may be associated with more than one region. Also, one region may be associated with multiple languages. Tables 1 and 2 show just one example of possible associations between languages and regions. Table 2 contains languages for which there is a stronger correlation between language and region than those languages contained in Table 1. Table 1 contains languages that are spoken in more than one region.

TABLE 1

| Language(s) | Region(s) |
| --- | --- |
| Spanish | Mexico, Spain, Argentina, Rest of Latin America |
| French | Canada, France, Switzerland |
| Portuguese | Portugal, Brazil |
| German | Germany, Austria, Switzerland |
| Chinese | Mainland China, Taiwan, Hong Kong, Singapore, Malaysia |
| English | United States, Canada, United Kingdom, South Africa, "Down Under", Australia, New Zealand |
| Flemish/Dutch | Netherlands, Belgium |

TABLE 2

| | |
| --- | --- |
| Japanese | Japan |
| Korean | Korea |

TABLE 2-continued

| | |
|---|---|
| Russian | Armenia, Azerbaijan, Byelorussia, Estonia, Georgia, Kurdistan, Kazakhstan, Lithuania, Latvia, Moldavia, Russia, Soviet Union, Tajikistan, Turkmenistan, Ukraine, Uzbekistan |
| Danish | Denmark |
| Finnish | Finland |
| Italian | Italy |
| Swedish | Sweden |
| Hindi, Telugu, Kannada, Marathi, Gujarati, Punjabi, Oriya, Assamese, Sindhi | India |
| Norwegian | Norway |

A language of a document may be determined, for example, by matching words that are contained in the document with words that are contained in a database. The words that are contained in the database may be associated with a language. Based on the matching, a language of the document may be determined. A computer program may perform such matching.

Associating a Host with One or More Regions

Figure 5A:
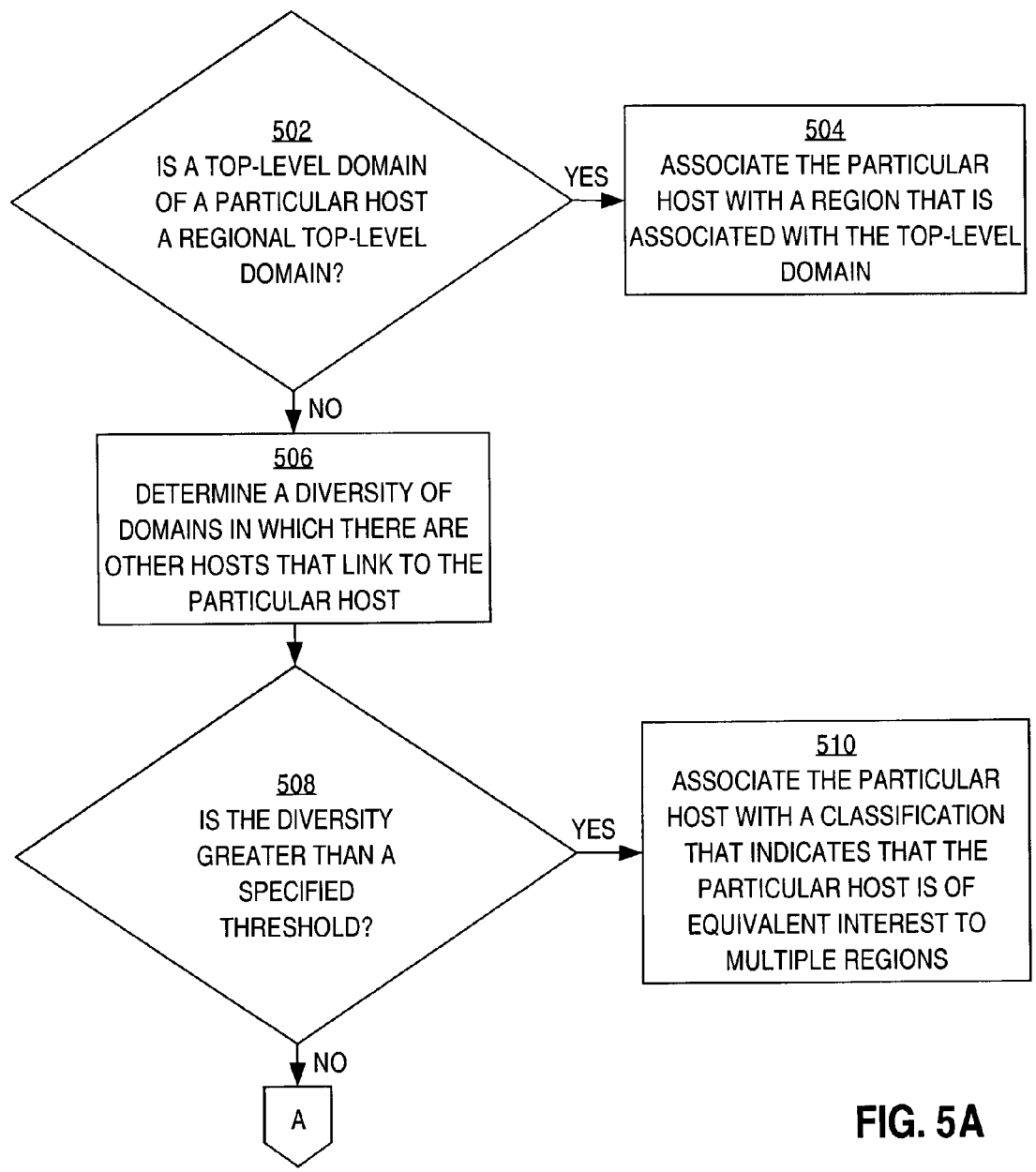
FIGS. 5A and 5B are flow diagrams that illustrate a technique, according to an embodiment of the present invention, for associating a particular host with one or more regions.
Figure 5B:
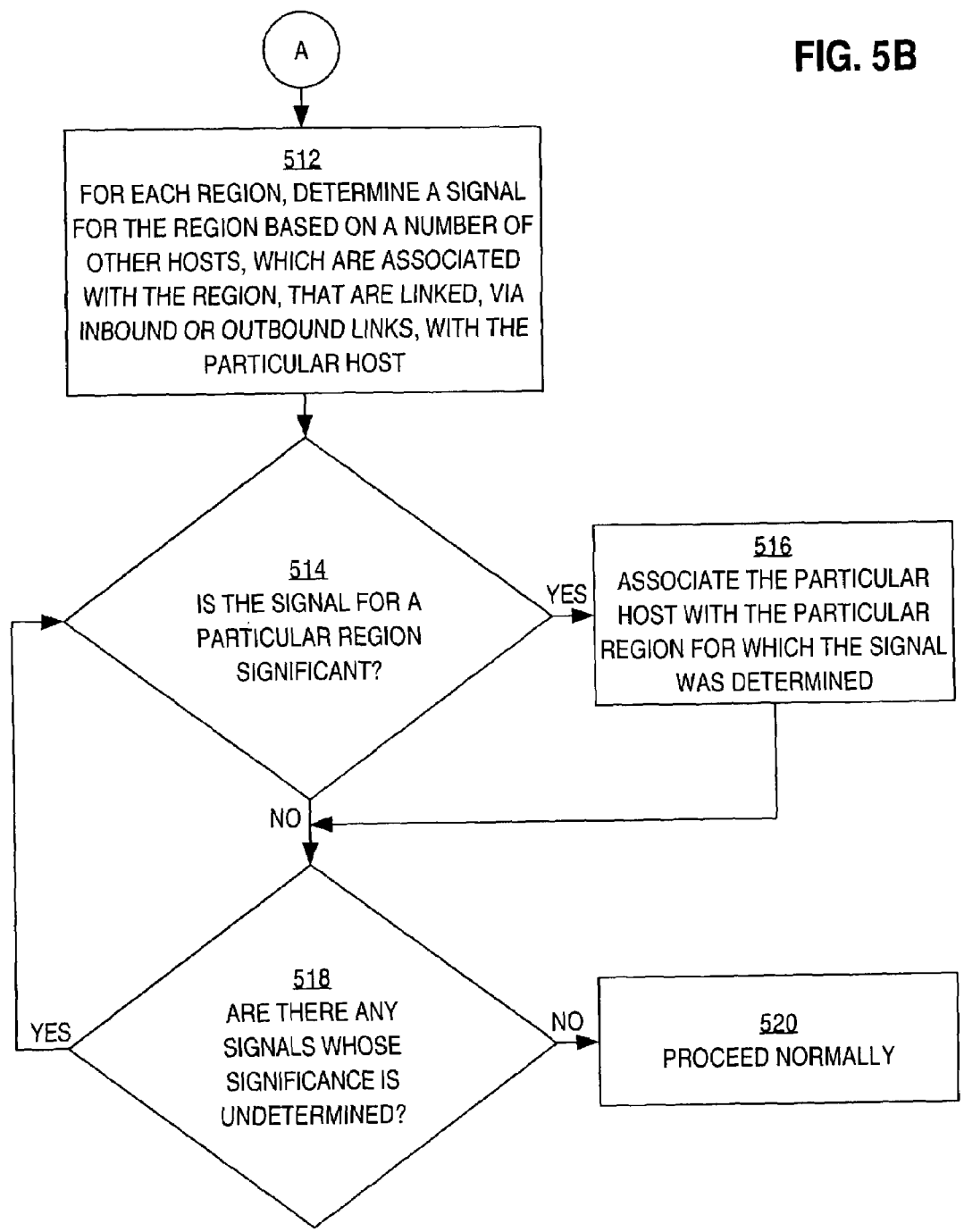

FIGS. 5A and 5B are flow diagrams that illustrate a technique, according to an embodiment of the present invention, for associating a particular host with one or more regions. As discussed above, a host is contained within a top-level domain, and the top-level domain may be regional or generic. Referring to FIG. 5A, in block 502, it is determined whether the top-level domain of the particular host is a regional top-level domain. For example, a computer program may compare the top-level domain of the particular host to a list of regional top-level domains to determine if the top-level domain of the particular host is a regional top-level domain.

If the top-level domain of the particular host is a regional top-level domain, then, in block 504, the particular host is associated with a region that is associated with (or indicated by) the top-level domain. For example, a computer program may add, to a database, an entry that associates the particular host (i.e., the host name) with the region that is associated with the top-level domain.

If the top-level domain of the particular host is not a regional top-level domain, then, in block 506, a diversity of a set of domains is determined. Each domain in the set contains at least one other host that has a link to the particular host. Another host may be considered to have a link to the particular host if at least one document that is stored on the other host has a link to a document that is stored on the particular host. In other words, a determination is made as to how diverse are the domains that include other hosts that link to the particular host. The measure of diversity may be referred to as the "entropy" of the particular host. A technique for determining the entropy of a host is described in further detail below.

In block 508, it is determined whether the diversity (i.e., entropy) is greater than a specified threshold. For example, a computer program may determine whether the diversity is greater than a specified numeric threshold (e.g., "−2.0").

If the diversity is greater than the specified threshold, then, in block 510, the particular host is associated with a classification value that indicates that the particular host is of equivalent interest to multiple regions. This may also be referred to as a "non-regional" classification value. For example, a computer program may add, to a database, an entry that associates the particular host (i.e., the host name) with a non-regional classification value. A host that is associated with a non-regional classification value may be referred to as a non-regional host. A non-regional host is deemed to not be of greater interest to one particular region than any other region. A non-regional host is deemed to be of approximately the same interest to many different regions.

If the diversity is not greater than the specified threshold, then, control passes to block 512 illustrated in FIG. 5B. Referring to FIG. 5B, in block 512, a separate signal is determined for each particular region in a set of regions. Each signal is based on a number of other hosts, which are associated with the particular region, that are linked, via inbound or outbound links, with the particular host. In other words, for each region, a separate signal is determined relative to the particular host. For example, a computer program may determine a separate signal, relative to the particular host, for each region. Each signal is a measurement, for a region, of the extent to which the particular host is related to that region, based on the number of links between the particular host and other hosts in that region. The links used in the determination may be links to the particular host, links from the particular host, or both. Signals are used to classify hosts into regions when the top-level domains of those hosts do not provide any regional indication (i.e., when the top-level domains are generic, like ".com"). A technique for determining a signal of a region relative to a host is described in further detail below.

In one embodiment, inclusion of a particular region in the set of regions for which signals are determined in block 512 is based on a language associated with the particular host. In one embodiment, each host is associated with up to two languages. These associations may be generated, for example, by a computer program that examines the language of each document stored on the particular host and determines the most dominant languages. If no language is associated with the particular host (e.g., the language is unknown), then the set of regions contains all regions. If the English language is associated with the particular host, then the set of regions contains regions that are associated with the English language (as shown in Tables 1 and 2 above) and regions that are associated with a second language that is associated with the particular host, if any. If a non-English language is associated with the particular host, then the set of regions contains regions that are associated with the non-English language (as shown in Tables 1 and 2 above).

In block 514, it is determined whether a particular signal (whose significance has not yet been determined) is significant. For example, a computer program may determine whether a signal is significant. There may be more than one significant signal for a particular host. In one embodiment, a particular signal is determined to be significant if:

$$|signal[i] - signalmax| \geq threshold * signalmax$$

where signal[i] is the particular signal for region i, where signalmax is a largest signal of any signal that has been determined relative to the host, and where threshold is a specified numeric threshold (e.g., "2.0").

If the particular signal is significant, then, in block 516, the particular host is associated with the region for which the particular signal was determined. For example, if a signal is significant, then a computer program may add, to a database, an entry that associates the particular host (i.e., the host name) with the region that is associated with the signal. Control then passes to block 518.

If the particular signal is not significant, then control passes to block 518. In block 518, it is determined whether there are any signals whose significance has not yet been determined. If there are any signals whose significance has not yet been determined, then control passes to block 514. Thus, the determination of block 514 is performed with regard to each signal. If there are not any signals whose significance has not yet been determined, then, in block 520, execution (e.g., of a computer program that associates hosts with one or more regions) proceeds normally.

In one embodiment, hosts that are manually designated as being undesirable are removed from the list of hosts. For example, a human editor may manually designate a certain host, which is known to generate annoying data, as being undesirable. Responding to the designation, a computer program may remove the host from the list of hosts.

After a host has been associated with one or more regions, a computer program may use the association to associate a document with one or more regions, as described above.

Determining the Entropy of a Host

Figure 6:
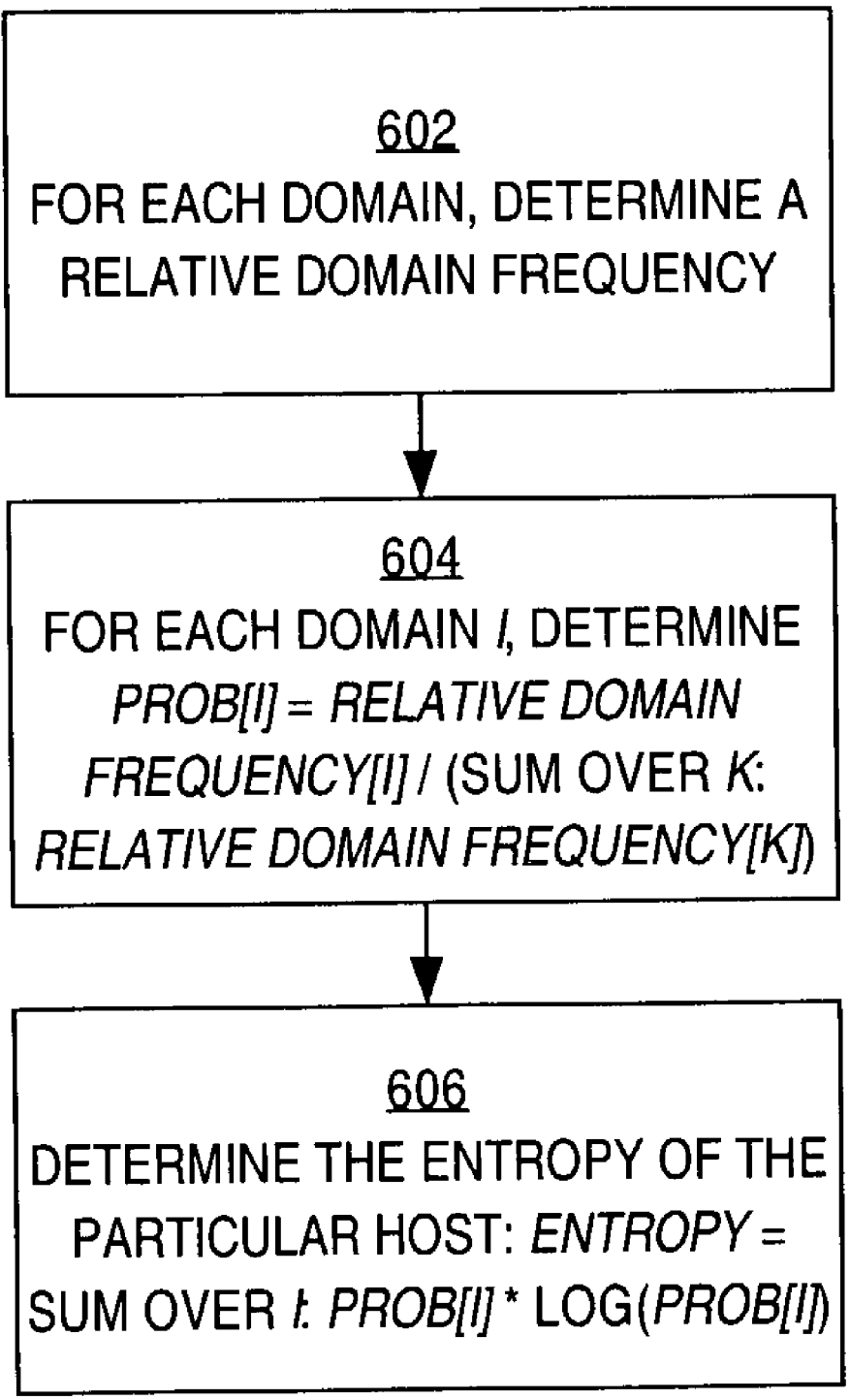
FIG. 6 is a flow diagram that illustrates a technique, according to an embodiment of the present invention, for determining the entropy of a particular host.

FIG. 6 is a flow diagram that illustrates a technique, according to an embodiment of the present invention, for determining the entropy of a particular host. In block 602, a relative domain frequency is determined for each domain in a set of domains. The relative domain frequency of a particular domain may be calculated as:

relative domain frequency=domain frequency/total domain frequency where domain frequency indicates a number of other hosts, in the domain, that have links (as described above) to the particular host; and where total domain frequency indicates a total number of hosts in the domain. For example, a computer program may determine, for each domain in a set of domains, a relative domain frequency.

In block 604, for each domain i that contains another host that has a link to the particular host, prob[i] is determined such that:

prob[i]=relative domain frequency[i]/(sum over k: relative domain frequency[k])

where k is an index variable; the summation runs over all of the domains in the set of domains. For example, a computer program may determine, for each domain i, prob[i].

In block 606, the entropy of the particular host is determined such that:

entropy=sum over i: prob[i]*log(prob[i]).

For example, a computer program may determine the entropy of the particular host according to the above equation.

After the entropy of a particular host is determined, the entropy may be used to determine if the host should be classified as being non-regional, as described above.

Determining a Signal of a Region Relative to a Host

Figure 7:
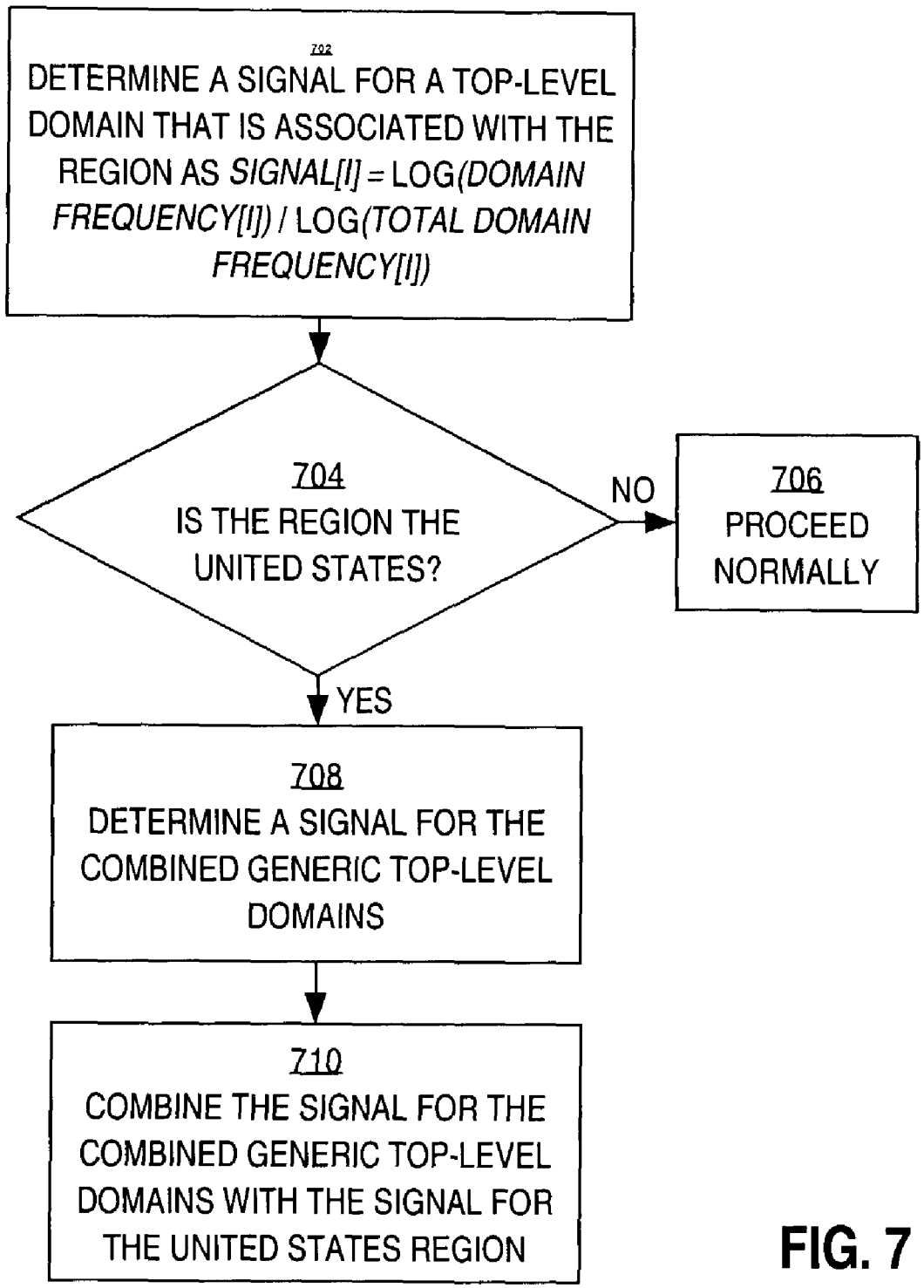
FIG. 7 is a flow diagram that illustrates a technique, according to an embodiment of the present invention, for determining a signal of a region relative to a host.

FIG. 7 is a flow diagram that illustrates a technique, according to an embodiment of the present invention, for determining a signal of a region relative to a particular host. In the description herein, for sake of clarity, hosts other than the particular host are referred to as "other" hosts.

In block 702, a signal for a top-level domain that is associated with (or that indicates) the region (e.g., ".fr" is the top-level domain associated with France) is determined. In one embodiment, the signal is determined by:

signal[i]=log(domain frequency[i])/log(total domain frequency[i])

where signal[i] is the signal for the top-level domain i; where domain frequency indicates a number of other hosts, in the top-level domain, that have links to or from the particular host; and where total domain frequency indicates a total number of hosts in the top-level domain. For example, a computer program may determine signal[i].

In one embodiment, if another host that is in a generic top-level domain has previously been associated (e.g., through the techniques described herein) with one or more regions, then that other host is considered as being contained in one or more regional top-level domains that are associated with the one or more regions that are associated with the other host. Thus, after each iteration of signal determination, more links to and from other hosts in generic top-level domains will be counted, for purposes of signal determination, as though they were links to and from other hosts in specific regional top-level domains.

In one embodiment, links to the particular host ("inbound" links) and links from the particular host ("outbound" links) may be made, respectively, to weigh more significantly or less significantly in determining the signal.

In block 704, it is determined whether the region is the United States. The top-level domains ".us" and ".usa" are top-level domains that are associated with the United States region. For example, a computer program may determine whether the region is the United States.

If the region is not the United States, then, in block 706, execution (e.g., of a computer program that determines a signal of a region relative to a host) proceeds normally.

If the region is the United States, then, in block 708, a signal is determined for the combined generic top-level domains. For example, a signal for the combined generic top-level domains may be determined by:

signal[gtld]=log(domain frequency[com])/log(total domain frequency[com])+log(domain frequency[net])/log(total domain frequency[net])+log(domain frequency[org])/log(total domain frequency[org])

where signal[gtld] is the signal for the combined generic top-level domains; where domain frequency[com], domain frequency[net], and domain frequency[org] each indicate a number of other hosts, in the top-level domains ".com", ".net", and ".org", respectively, that have links to or from the particular host; and where total domain frequency[com], total domain frequency[net], and total domain frequency[org] each indicate a total number of hosts in the top-level domains ".com", ".net", and ".org", respectively. For example, a computer program may determine signal[gtld]. Generic top-level domains other than ".com", ".net", and ".org" may also be included in the determination.

In block 710, the signal for the combined generic top-level domains is combined with the signal for the United States region. This is because hosts in the generic top-level domains are probably located in the United States. For example, a computer program may add signal[gtld] to the signal for the United States region. The sum becomes the new signal for the United States region.

Hardware Overview

Figure 8:
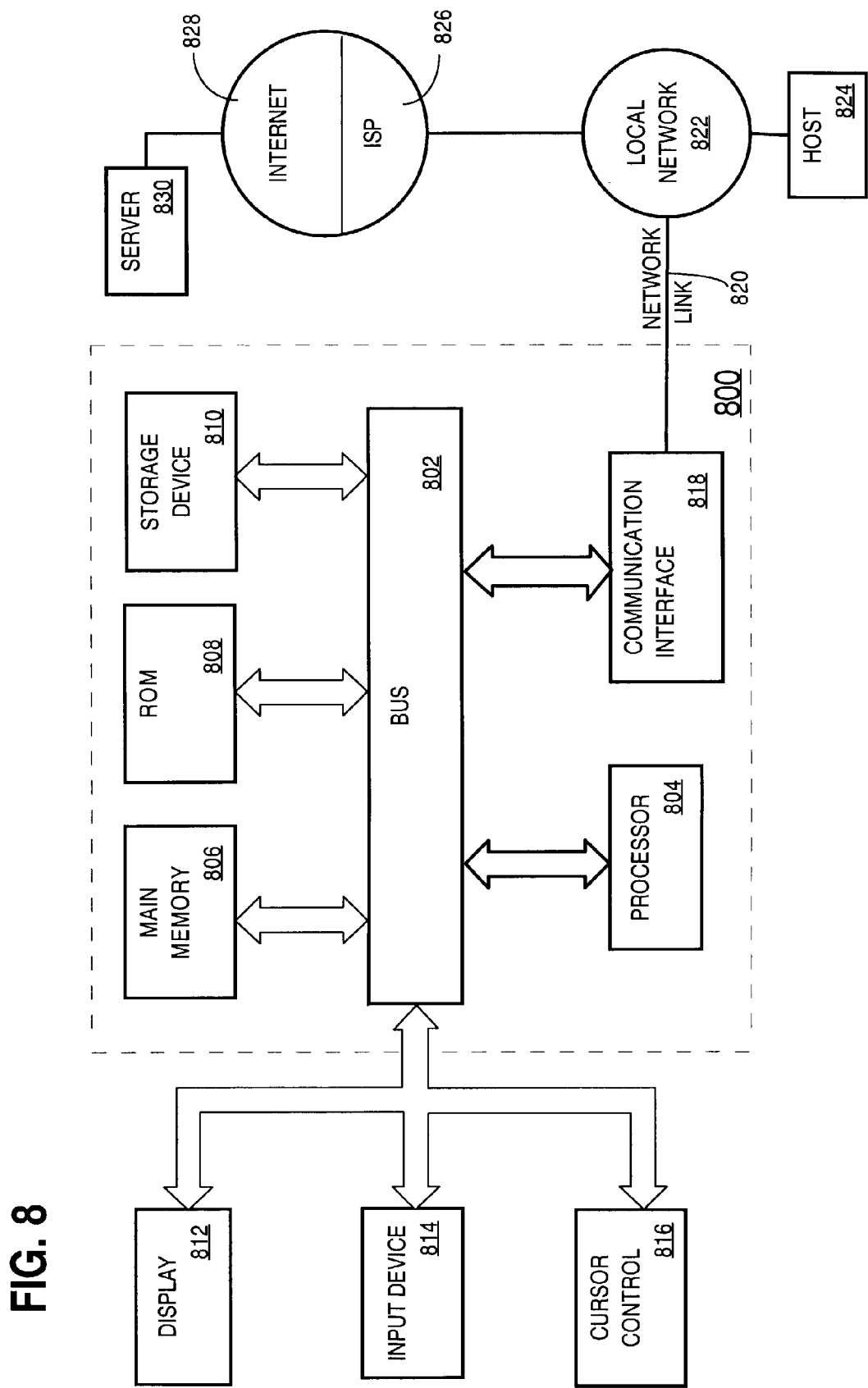
FIG. 8 is a block diagram that illustrates a computer system 800 upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for adjusting a rank of document, the method comprising:

generating, in a memory of a computer system, a list of two or more documents that represent results of a computer-executed query, wherein each document within the list of documents is associated with a separate rank;

adjusting a particular rank that is associated with a particular document of the two or more documents; and storing, in a storage mechanism of the computer system, the list of two or more documents in which the order of the documents in the list has been modified based on the adjustment of the particular rank, wherein adjusting the particular rank is based on at least one of (a) a first weight that is associated with a language classification value that is associated with the particular document and (b) a second weight that is associated with a region classification value that is associated with the particular document.

2. The method of claim 1, wherein the step of adjusting the particular rank comprises adjusting the particular rank based on only the greater of the first weight and the second weight.

3. A computer-implemented method for adjusting a rank of a document, the method comprising:

generating, in a memory of a computer system, a list of two or more documents that represent results of a computer-executed query, wherein each document within the list of documents is associated with a separate rank, and wherein one or more terms of the query were received through one of a first portal and a second portal;

determining a portal through which the one or more terms of the query were received;

if the one or more terms of the query were received through the first portal, then adjusting, based on a first set of weights that is associated with the first portal, a particular rank that is associated with a particular document of the two or more documents;

if the one or more terms of the query were received through the second portal, then adjusting the particular rank based on a second set of weights that is associated with the second portal; and storing, in a storage mechanism of the computer system, the list of two or more documents in which the order of the documents in the list has been modified based on the adjustment of the particular rank.

4. The method of claim 3, wherein the first portal is associated with a first geographic region with which the second portal is not associated, and wherein the second portal is associated with a second geographic region with which the first portal is not associated.

5. A computer-readable medium carrying one or more sequences of instructions which, when executed by one or more processors, causes the one or more processors to perform the method of claim 1.

6. A computer-readable medium carrying one or more sequences of instructions which, when executed by one or more processors, causes the one or more processors to perform the method of claim 2.

7. A computer-readable medium carrying one or more sequences of instructions which, when executed by one or more processors, causes the one or more processors to perform the method of claim 3.

8. A computer-readable medium carrying one or more sequences of instructions which, when executed by one or more processors, causes the one or more processors to perform the method of claim 4.

* * * * *